(12) United States Patent
Briesemeister et al.

(10) Patent No.: US 7,082,744 B2
(45) Date of Patent: Aug. 1, 2006

(54) VEHICLE STABILIZER SYSTEM

(75) Inventors: Richard A. Briesemeister, Clear Lake, WI (US); Christopher M. Schloesser, Hudson, WI (US); Mark Woodruff, Bergen, NY (US)

(73) Assignee: Oxbo International Corporation, Clear Lake, WI (US)

( * ) Notice: Subject to any disclaimer, the term of this patent is extended or adjusted under 35 U.S.C. 154(b) by 34 days.

(21) Appl. No.: 10/692,307

(22) Filed: Oct. 22, 2003

(65) Prior Publication Data

US 2005/0086923 A1 Apr. 28, 2005

(51) Int. Cl.
*A01D 46/00* (2006.01)
(52) U.S. Cl. ...................................... 56/328.1; 180/53.1
(58) Field of Classification Search ................... 56/208, 56/209, 210, 212, 213, 214, 228, 328.1, 330, 56/DIG. 10, DIG. 11; 280/840, 6.1, 6.11
See application file for complete search history.

(56) References Cited

U.S. PATENT DOCUMENTS

| | | | |
|---|---|---|---|
| 3,184,908 A | | 5/1965 | Rust |
| 3,325,984 A | | 6/1967 | Christie et al. |
| 3,449,895 A | | 6/1969 | Pertics |
| 3,538,694 A | | 11/1970 | Holloway |
| 3,690,054 A | | 9/1972 | De Carlo et al. |
| 4,031,695 A | * | 6/1977 | Diggs ........................... 56/237 |
| 4,134,251 A | | 1/1979 | Burton |
| 4,172,352 A | * | 10/1979 | McCarthy et al. ......... 56/340.1 |
| 4,329,836 A | * | 5/1982 | Scudder ........................ 56/330 |
| 4,341,062 A | | 7/1982 | Scudder |
| 4,557,276 A | * | 12/1985 | Hyman et al. ................. 460/9 |
| 4,750,322 A | | 6/1988 | Korthuis |
| 4,972,662 A | | 11/1990 | Korthuis et al. |
| 4,976,094 A | | 12/1990 | Williamson et al. |
| 5,092,113 A | | 3/1992 | Turunen |
| 5,109,657 A | | 5/1992 | DeVries |
| 5,170,614 A | | 12/1992 | Williamson et al. |
| 5,181,373 A | | 1/1993 | Littau |
| 5,339,612 A | | 8/1994 | Scott |
| 5,341,630 A | | 8/1994 | Littau |
| 5,355,667 A | * | 10/1994 | Scott ........................... 56/330 |
| 5,495,708 A | | 3/1996 | Scott et al. |
| 5,531,283 A | * | 7/1996 | Austin et al. .............. 180/53.1 |
| 5,647,194 A | | 7/1997 | Scott et al. |
| 5,661,963 A | * | 9/1997 | Scott ......................... 56/328.1 |

(Continued)

OTHER PUBLICATIONS

Microtork-Rotovalve Products, Inc., http://www.microtork-rotovalve.com/; 3 pages; (Date: publicly known prior to the filing date of the present application).

*Primary Examiner*—Árpád Fábián Kovács
(74) *Attorney, Agent, or Firm*—Merchant & Gould P.C.

(57) ABSTRACT

A stabilizer system provides leveling for a towed harvester vehicle. The harvester includes a hitch having a gimbal mounting to the tractor. The subframe is utilized to accommodate the gimbal and provides for utilizing the mass of the tractor to react to the stabilizer system leveling forces. The harvester utilizes telescoping assemblies that are placed intermediate the hitch and the frame as well as between the axle and the frame. The telescoping assemblies retract and extend to varied positions and provide correction. Flow to extend and retract the telescoping assemblies is provided through a proportional pendulum type valve that increases flow as needed when tilted from horizontal. The flow is increased and decreased in proportion to the amount of tilting from the home vertical position.

9 Claims, 14 Drawing Sheets

U.S. PATENT DOCUMENTS

| | | | |
|---|---|---|---|
| 5,711,139 A * | 1/1998 | Swanson | 56/10.2 R |
| 5,842,553 A * | 12/1998 | Garland | 198/316.1 |
| 5,857,823 A | 1/1999 | MacEachern | |
| 5,918,448 A * | 7/1999 | Wheeler | 56/10.4 |
| 5,956,933 A | 9/1999 | Heard | |
| 6,178,730 B1 | 1/2001 | Visser | |
| 6,463,725 B1 | 10/2002 | Briesemeister | |
| 6,467,776 B1 * | 10/2002 | Fayat | 280/6.15 |
| 6,625,964 B1 * | 9/2003 | McLeod et al. | 56/11.9 |
| 6,755,589 B1 * | 6/2004 | Friesen | 403/141 |

* cited by examiner

VEHICLE STABILIZER SYSTEM

BACKGROUND OF THE INVENTION

1. Field of the Invention

The present invention relates to a vehicle stabilizing and leveling system, and in particular to a stabilizer system used with a towed vehicle such as an agricultural harvester.

2. Description of the Prior Art

Agricultural equipment that is generally towed behind a tractor faces challenges to maintain stability while traveling over uneven terrain. With certain types of equipment, maintaining stability is a particular concern due to a higher center of gravity and mass of elevated components while the equipment is moving. In particular, equipment utilized to access fruit from trees causes stability and leveling problems due to elevated engagement assemblies. Some equipment has a moving mast supporting a number of arms that provide relative side-to-side movement at a high center of gravity. In addition, the equipment may be pushed or pulled laterally due to engagement with the trees as it is towed. In extreme cases, the equipment may be subject to tipping over from passing over the uneven terrain and/or movement of the mast and arms to an extended position.

One way to overcome the problem is to lower the center of gravity on the towed vehicle. This is not always possible by reconfiguring the equipment. Adding mass at a lower portion of a harvester may lower the center of gravity, but also increases the weight of the towed vehicle. However, the increased weight makes towing more difficult and requires additional power for the additional weight being towed. Moreover, vehicle weight may be restricted by allowable ground pressure, thereby preventing the use of added mass for some applications.

Other systems have utilized controls to adjust the relative positions of various components on the towed vehicle. Leveling systems include control circuits that move certain elements relative to the frame of the towed vehicle. However, electronic controls may not provide a sufficiently quick response time to correct for irregularities and to counteract tipping. In addition, corrections have not been made proportionally to ensure the correction is also proportional. Therefore, attempts to utilize electronic controls have proven to be unsatisfactory. Improper reaction times with under compensation and overcompensation may lead to oscillation in an unintended manner that worsens the situation, leading to control problems with the towed vehicle.

It can be seen that a new and improved stabilizing system for a towed vehicle is needed. Such a system should provide for simple, reliable correction when the towed vehicle is tilted in an unintended manner. Such a system should also utilize the mass of the towing vehicle without adding weight to the towed vehicle to offset the elevated moving assemblies of the towed vehicle. Such a system should provide for correction while providing sufficient flexure to accommodate the towing vehicle without binding, yet taking advantage of the weight of the towing vehicle. Corrections to the stability of the system should be made in a manner proportional to the degree of tilting from the desired orientation to eliminate unwanted oscillation. The present invention addresses these as well as other problems with stabilizing towed vehicles.

SUMMARY OF THE INVENTION

An agricultural harvester includes a stabilizer system to maintain the harvester at a level position during operation and to prevent tipping. Leveling is accomplished utilizing hydraulic adjustment systems. A harvester generally includes a frame, a hitch that couples to a tractor, a rear axle with a pair of wheels and a shaker assembly. The shaker assembly includes a mast support as well as a mast having horizontal reciprocating arms mounted thereon and supporting pairs of whorl arrangements. The whorl arrangements include beater rods extending outward in a radial configuration and engage citrus tree branches and remove fruit. In operation, the arms reciprocate back and forth to impart a shaking motion to the whorl arrangements with the adjacent arms having alternating back and forth motions.

To provide stability and leveling, the hitch assembly includes a gimbal between the tractor and harvester and connecting to a subframe that mounts to the underside of the tractor. The gimbal allows for relative pivoting along multiple axes and also includes a rotary faceplate so that twisting may occur between the towing vehicle and the towed vehicle.

The harvester uses a hydraulic leveling system utilizing a proportional control valve. Hydraulic cylinder assemblies are mounted between the harvester frame and the hitch assembly as well as being mounted between the frame and the rear axle. Each assembly includes a cylinder and piston, which is extendible and may be varied by controlling flow to either the cylinder end or the piston end. As the relative pressures are decreased and increased, the piston and cylinder respond and either retract or extend. By extending and retracting the piston and cylinder assemblies, the relative position between the hitch and the frame, as well as the relative position between the axle and the frame changes, thereby changing the position of the harvester frame. Such correction provides for leveling the harvester when tilting is detected, such as when it passes over uneven terrain. As the proportional flow valve controls the flow to both assemblies, correcting motion from the cylinder assemblies is appropriately coordinated. The tractor and the rear axle of the harvester counterbalance the leveling forces of the cylinder assemblies of the stabilizer system.

The proportional flow valve is preferably a pendulum type valve that allows for increased flow to either the cylinder side or piston side of the telescoping assemblies. Flow is increased to the piston side and decreased to the cylinder side when the pendulum valve is tilted from vertical in a first direction while flow is decreased to the piston side and increased to the cylinder side when tilting is detected in a second direction from vertical. Moreover, the greater the angle of the tilt, the more the valve opens and flow is increased to the respective telescoping assemblies. In this manner, proportional changes and proportional correction are accomplished in a coordinated manner. The pendulum valve provides for instantaneous response when oriented at a tilted position to provide correction for leveling.

The present invention also utilizes overload control valves to provide for the harvester encountering an obstacle and needing correction. Such a situation may occur where the entire vehicle is not tilted but one of the tires passes over a rock and it may be preferable to release pressure from the telescoping assemblies at either the cylinder end or the piston end. The addition of vented counter balancing vent valves provides for the instantaneous correction without causing the entire assembly to tilt. Such a system overcomes systems wherein correction is not proportional and is not sufficiently responsive.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views.

DETAILED DESCRIPTION OF THE PREFERRED EMBODIMENT

Figure 1:
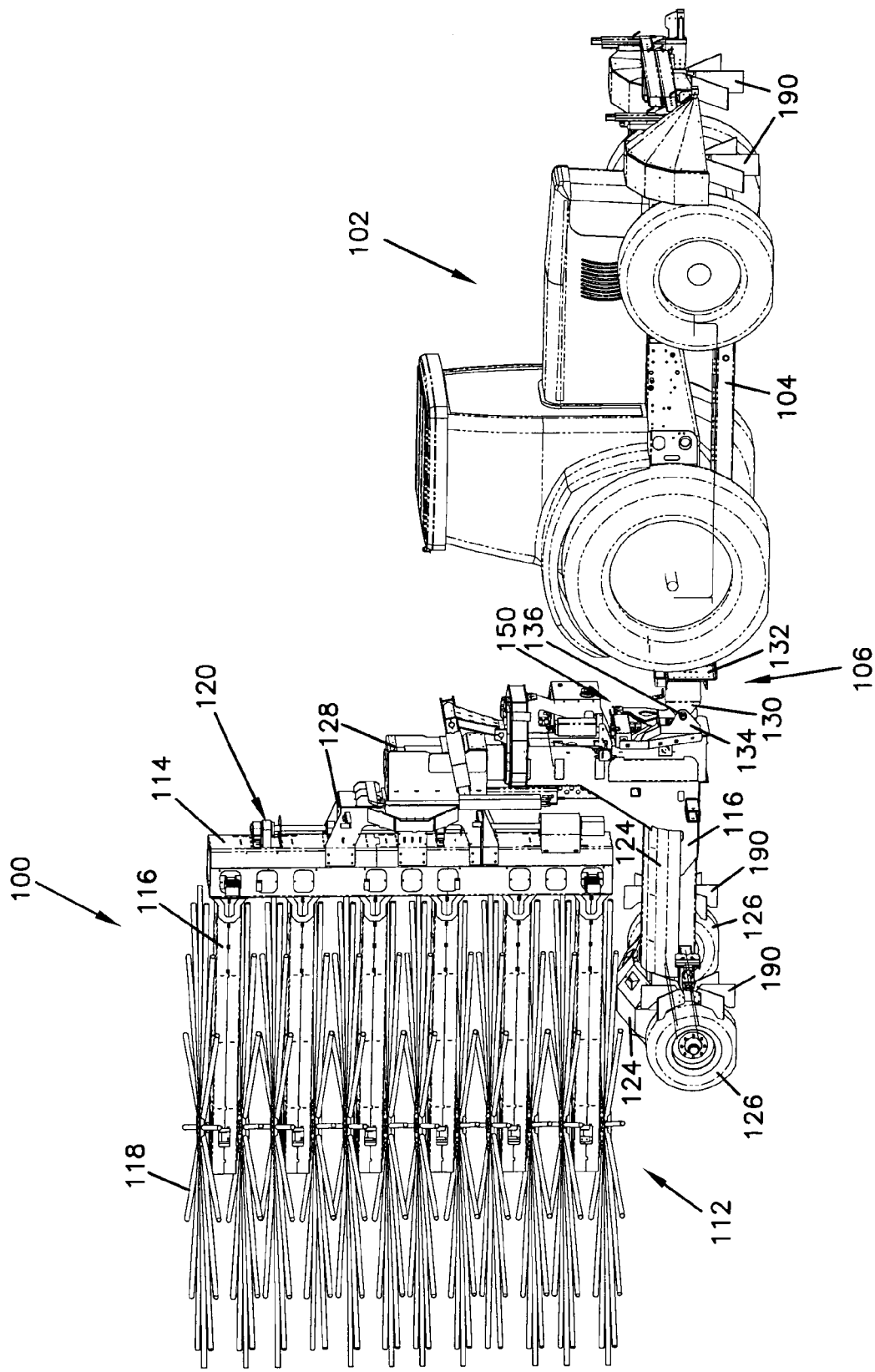
FIG. 1 is a perspective view of a tractor and a harvester with a stabilizer system according to the principles of the present invention.

Referring now to the drawings, and in particular to FIG. 1, there is shown a harvester, generally designated 100 having stabilizing and leveling devices according to the principles of the present invention, coupled to a tractor, generally designated 102. The harvester 100 generally includes a harvester frame 110 supported at the front on a hitch assembly 106 mounted to the tractor 102 and supported at the rear on an axle 122 having wheels 126. The harvester 100 is generally configured for removing fruit from citrus trees and includes a shaker assembly 112 having a mast 114 on a mast support 128 extending upward from the harvester 100. The mast 114 supports a plurality of horizontally extending arms 116. Each of the arms 116 supports two whorl arrangements 118 having rods extending radially outward. The whorl arrangements 118 are quickly extended and retracted on the arms 116 to engage and disengage the citrus tree, thereby shaking the tree and loosening and removing fruit. The whorl arrangements 118 are freely rotatably mounted on the arms 116 so that the trees spin the whorl arrangements 118 as the tractor 102 and harvester 100 proceed along the grove. A hydraulic motor 120 powers the harvester 100 to provide an agitating back and forth motion to the whorl arrangements 118. The mast 114 is also movable on the mast support 128 to move inward and outward to optimize the position of the shaker assembly 112 relative to the fruit trees. Portions of the harvester 100 include an arcing cover 124 so that the fruit is free to fall to the ground where it may be easily collected without damage from impact with sharp or blunt portions of the harvester 100 or damaging or clogging portions of the harvester machinery. Flexible paddles 190 are mounted in front of the wheels 126 as well as on the tractor 102 to clear the path before the tires so that the fruit is not squashed after falling to the ground. The fruit on the ground may then be collected manually or by mechanized pickup devices.

Figure 2:
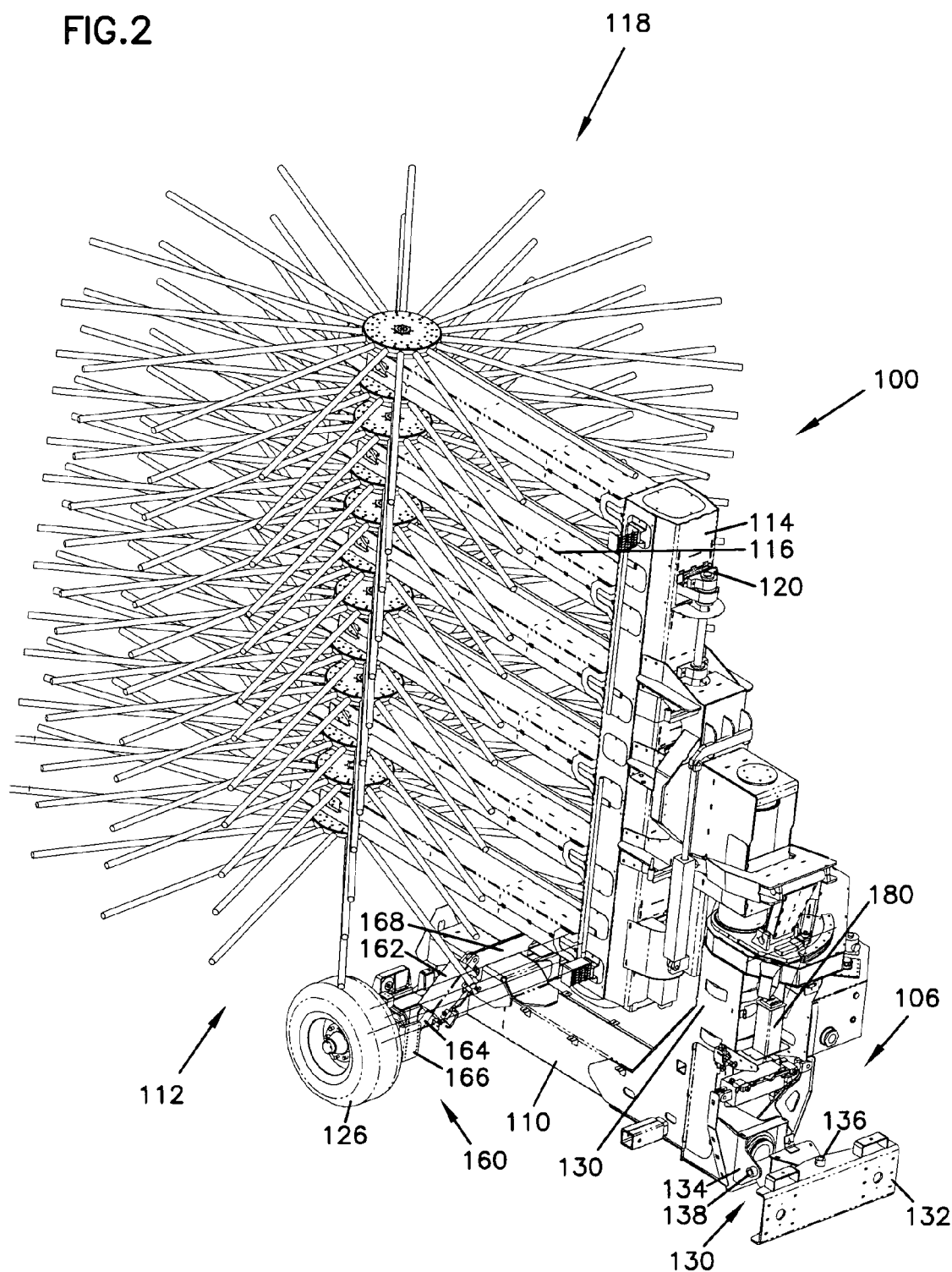
FIG. 2 is a perspective view of the stabilizer system.
Figure 3:
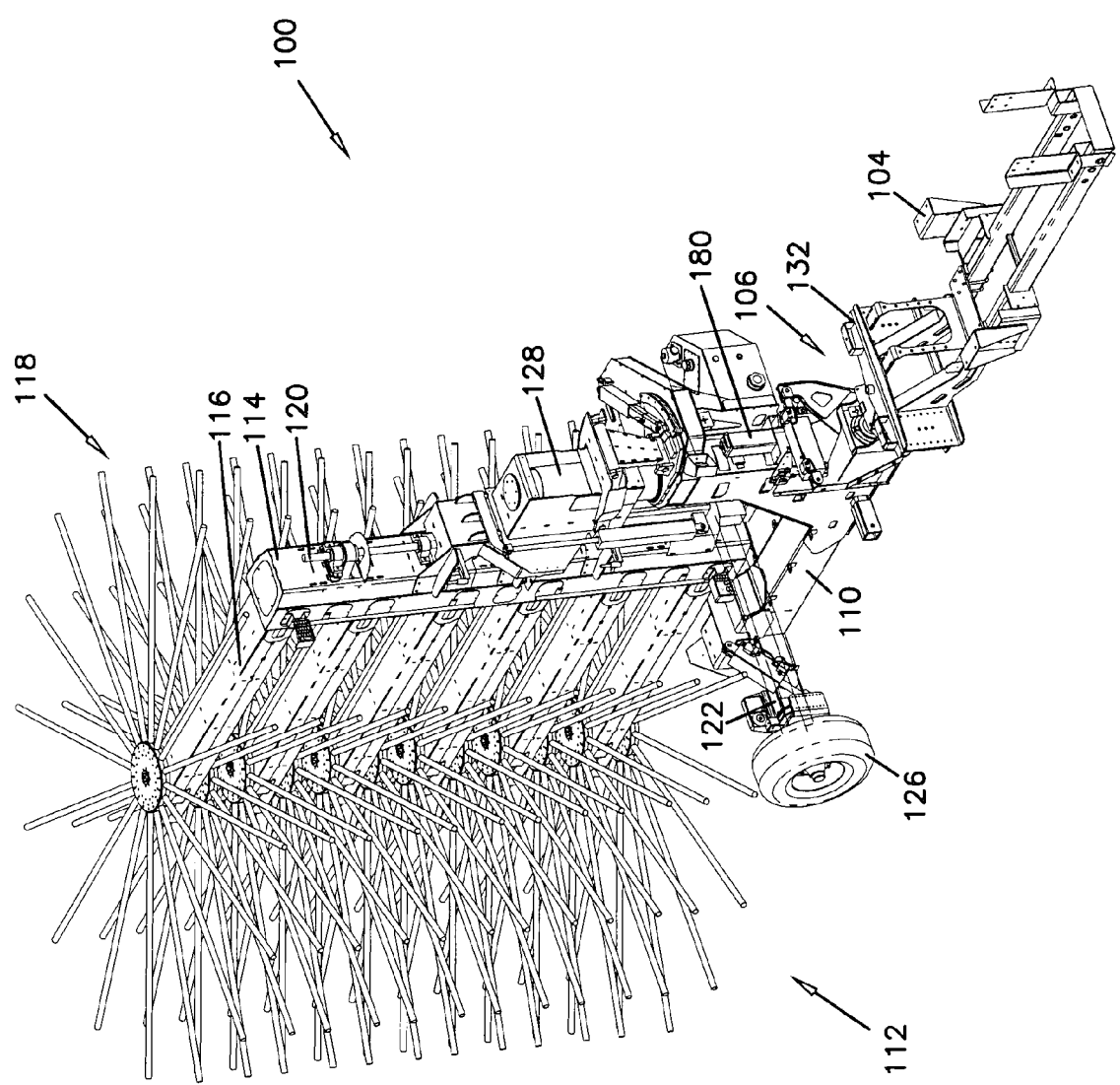
FIG. 3 is a perspective view of a the stabilizer and support frame for the tractor.
Figure 4:
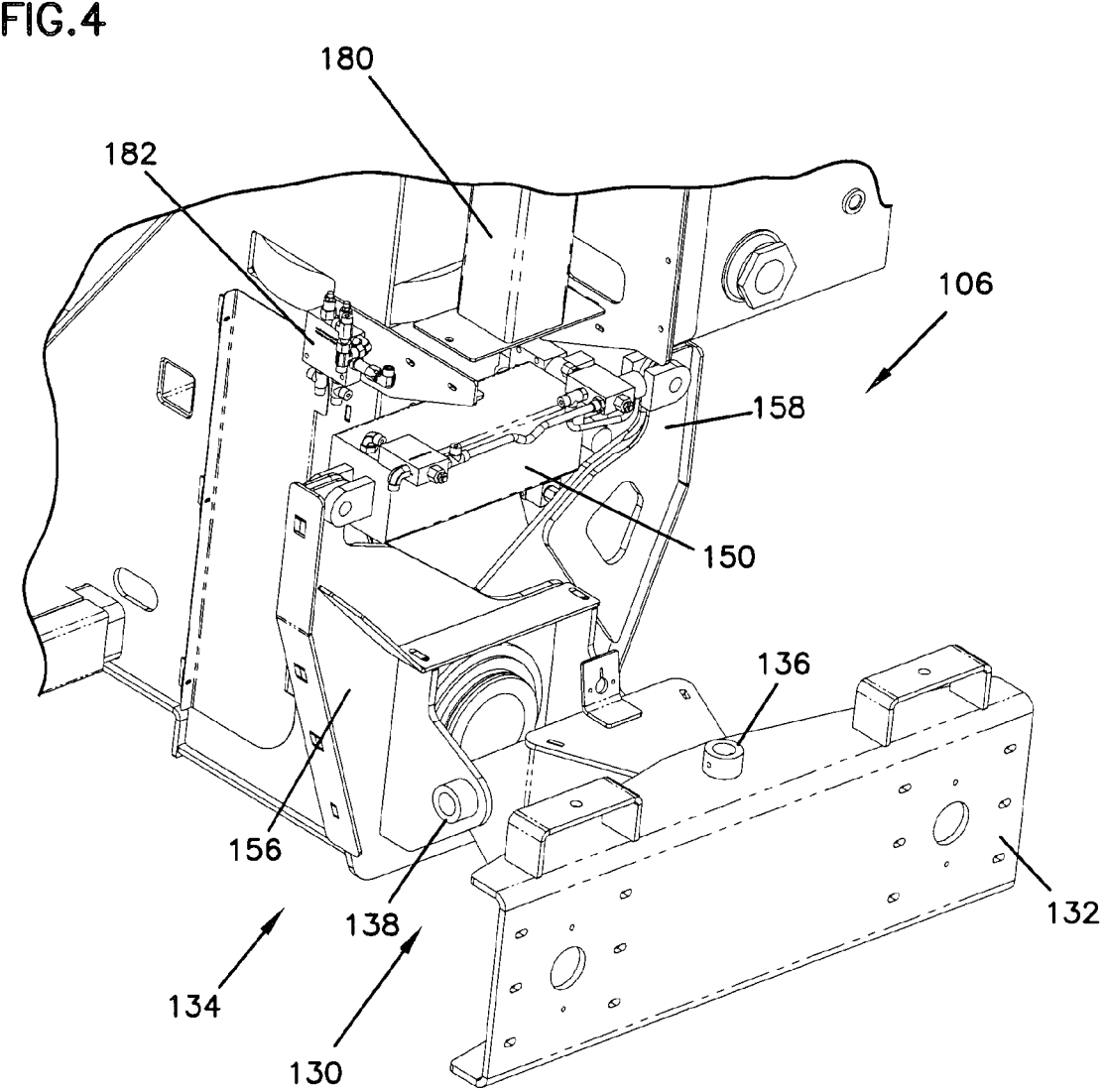
FIG. 4 is a perspective view of the gimbal at the connection from the harvester to the tractor support frame.

It can be appreciated that due to the height of the mast 114, support arms 116 and whorl arrangements 118 resulting in a raised center of gravity, as well as the resistance provided from engagement with the trees, stability may become a concern with such harvesters 100. The harvester 100 includes a hitch assembly 106 that utilizes the weight of the tractor 102 through a subframe 104 to resist tipping and rolling, as shown most clearly in FIGS. 2–4. The hitch assembly 106 includes a gimbal 130 including a harvester mounting portion 134 on a rotary faceplate and a tractor mounting portion 132. A vertical pin 136 and a horizontal universal pin 138 provide relative pivoting about multiple axes.

The present invention utilizes a mounting arrangement and telescoping assemblies to provide complementary methods of leveling that achieve even greater stability, as explained below.

To provide clarity and consistency between the views, the reference terms "port" and "starboard" will be used with their usual meanings to describe the tilting and leveling of the harvester 10. The port side shall be the left side when viewed from the rear, or right side while viewed from the front, while starboard shall be the right side when viewed from the rear, or left side when viewed from the front.

As explained above, the harvester frame 110 pivotally mounts to the hitch assembly 106. In addition, a telescoping assembly 150 having a cylinder 152 and a piston 154 mounted to a hitch mounting member 156 and a frame mounting member 158 respectively, controls the relative position between the frame and the hitch assembly 106, as shown in FIGS. 5–12. Although the hitch assembly 106 allows for relative movement between the harvester 100 and the tractor 102, the connection between the hitch attachment member 156 and the frame mounting member 158 through the cylinder 152 and the piston 154 provides hydraulic resistance through the tractor 102 against quick relative rotation and diminishes the likelihood of the harvester 100 tipping. The gimbal 130 allows the leveling forces from the telescoping assembly 150 to be transferred through the subframe 104 to the tractor 102. The frame 110 is also pivotally mounted on the axle 122. A rear telescoping assembly 160 having a cylinder 162 and a piston 164 controls the relative position of the frame 110 and the rear axle 122. By changing the relative angular position between the axle 122 and the frame 110 while at the same time changing the relative angular position of the mounting members 156 and 158 and therefore the position of the frame 110 relative to the hitch 106, correction can be made for irregularities in the ground and provide leveling.

The frame roll cylinder 152 having a telescoping piston 154 is intermediate the mounting members 156 and 158. By extending and retracting the piston 154 into and out of the cylinder 152 through hydraulic pressure, the length of the assembly 150 and the relative position between the mounting members 156 and 158 may be varied, as explained below and shown in FIGS. 4–12.

Figure 6:
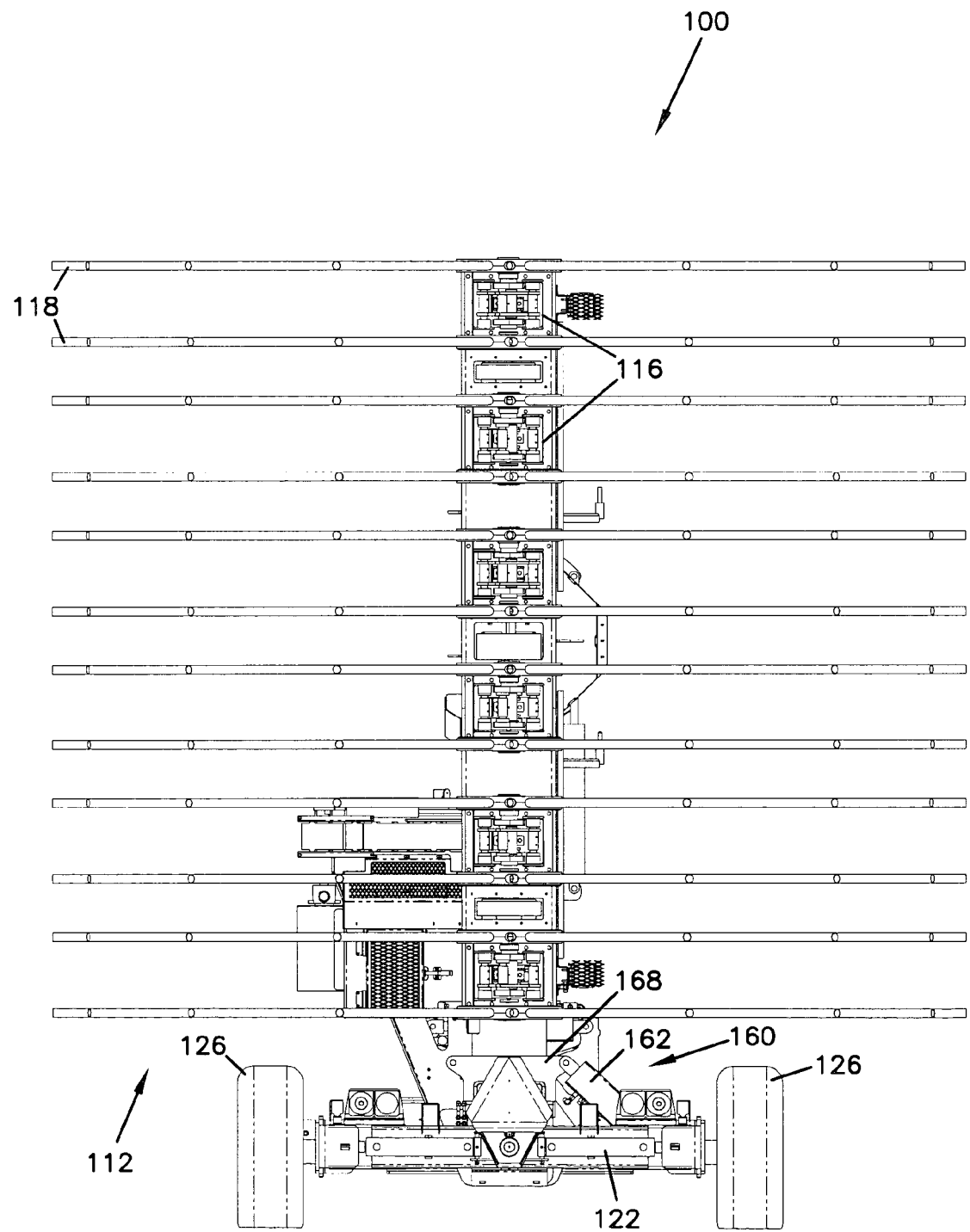
FIG. 6 is a rear elevational view of the harvester and stabilizer at a level position
Figure 7:
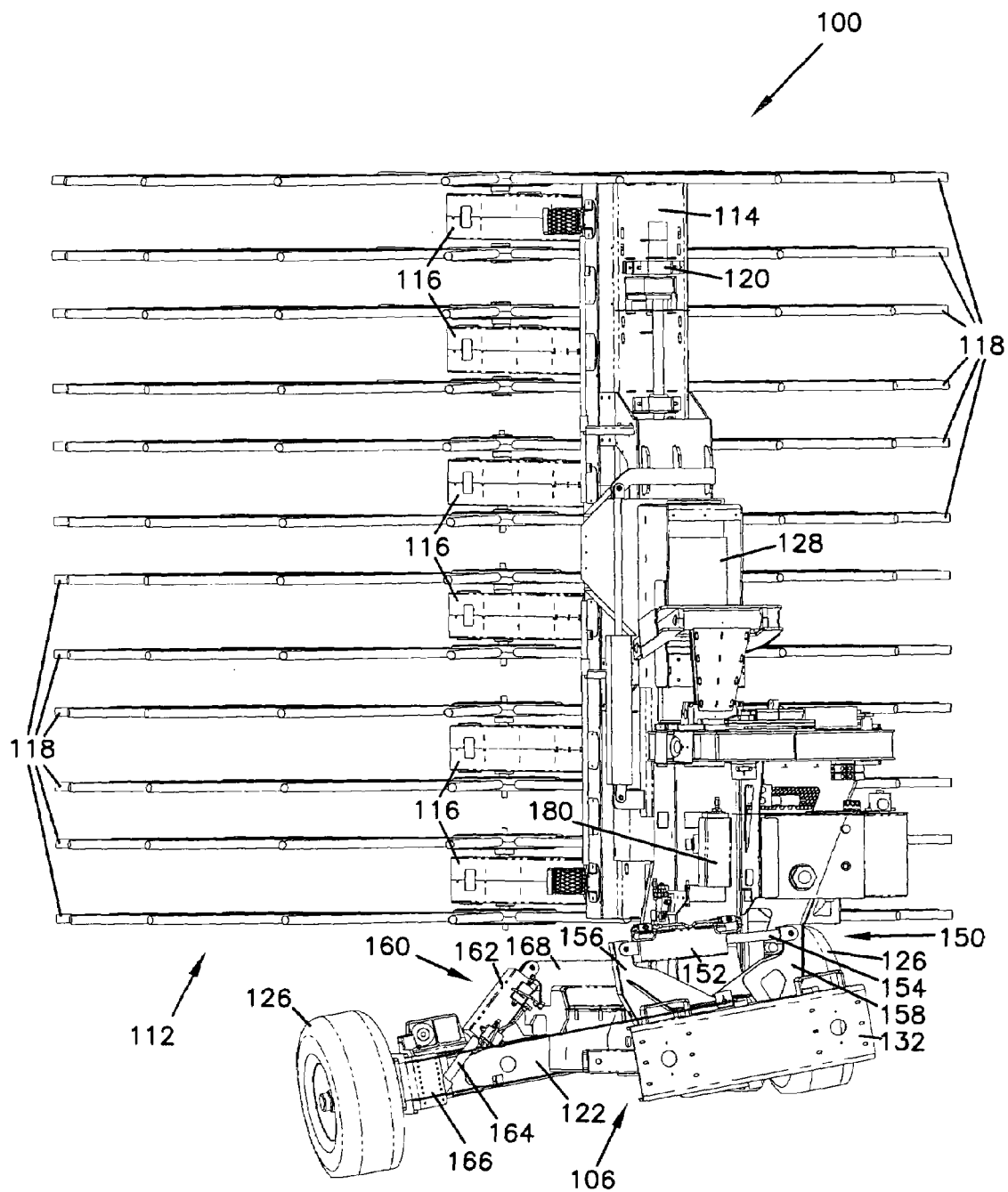
FIG. 7 is a front perspective view of the harvester and stabilizer correcting the tilt toward a first direction.

As shown in FIGS. 6 and 7, a rear telescoping assembly 160 includes a frame attachment member 168 and an axle attachment member 166. A rear leveling cylinder 162 having a telescoping piston 164 mounts intermediate the attachment members 166 and 168. By extending and retracting the piston 164 from the cylinder 162, the length of the telescoping assembly 160 and the relative position of the attachment members 166 and 168 may be varied, thereby varying the relative angular position of the frame 110 and the rear axle 122, as explained herein below.

Figure 10:
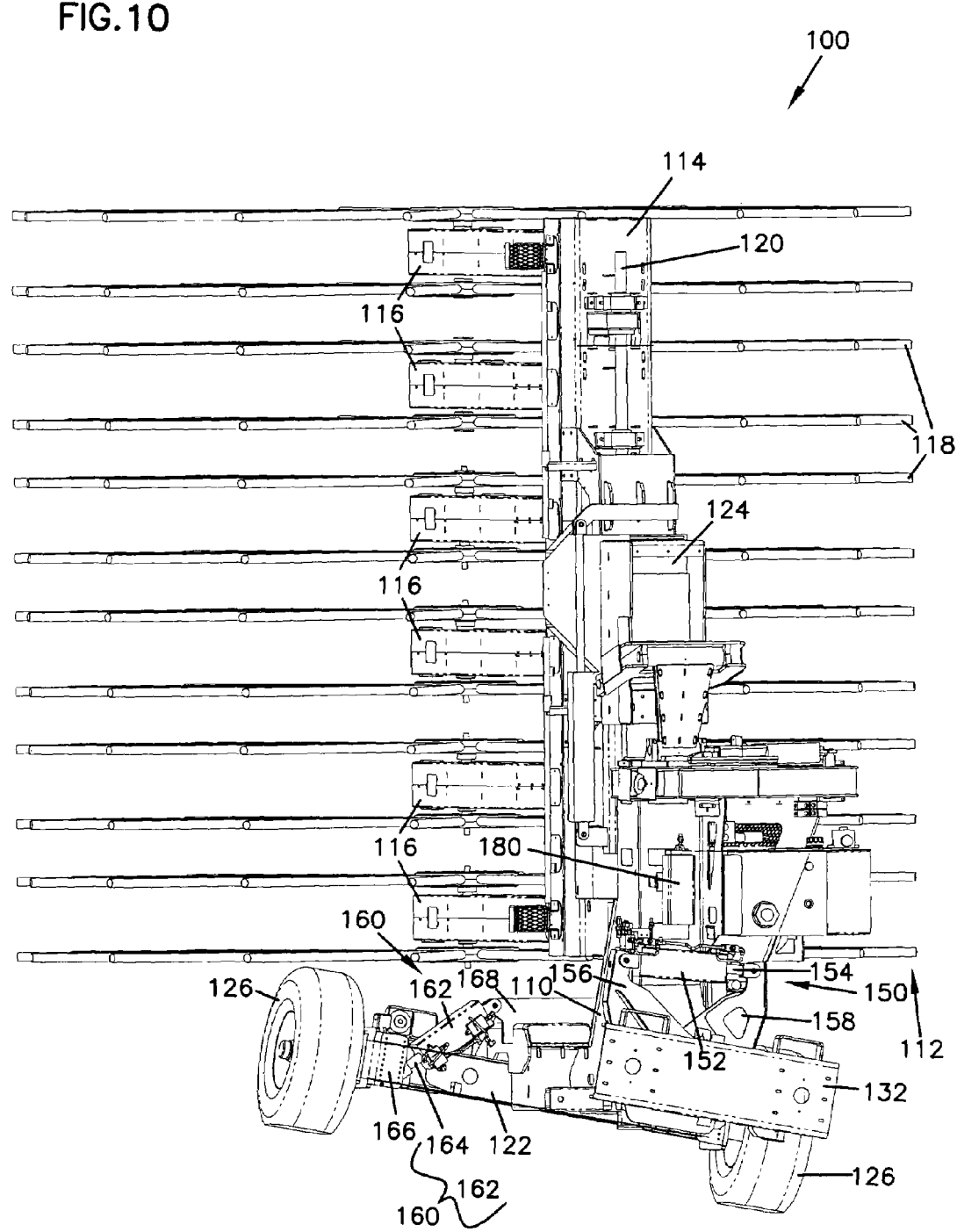
FIG. 10 is a front perspective view of the harvester and stabilizer correcting the tilt toward a second direction.

The telescoping assemblies 150 and 160 are both controlled by a pendulum type valve 180 mounted in a housing on the front of the harvester and shown most clearly in FIG. 10. An example of such a valve is model number 1000 manufactured by Microtork-Rotovalve of Warren, N.J. The stabilizer system also includes a vented counterbalance valve 182, shown in FIG. 4, to hold the system in position. A dual vented counterbalance valve 184 provides pressure relief when encountering obstacles, as explained below. The pendulum valve operates to deliver hydraulic fluid to extend the piston and cylinders 152 and 154, and 162 and 164 when tilted in a first direction and to retract the piston and cylinders 152 and 154, and 162 and 164 when tilted in the opposite direction. The pendulum valve 180 coordinates the retraction and extension so that correction is made both at the rear and front simultaneously, providing almost instant correction that is not possible with other stabilizing systems, which are not sufficiently responsive. Moreover, the valve 180 is a proportional flow valve, so that correction is made in response to the tilt angle. The greater the tilt angle, the more the valve opens and increases the flow and correction.

Figure 5:
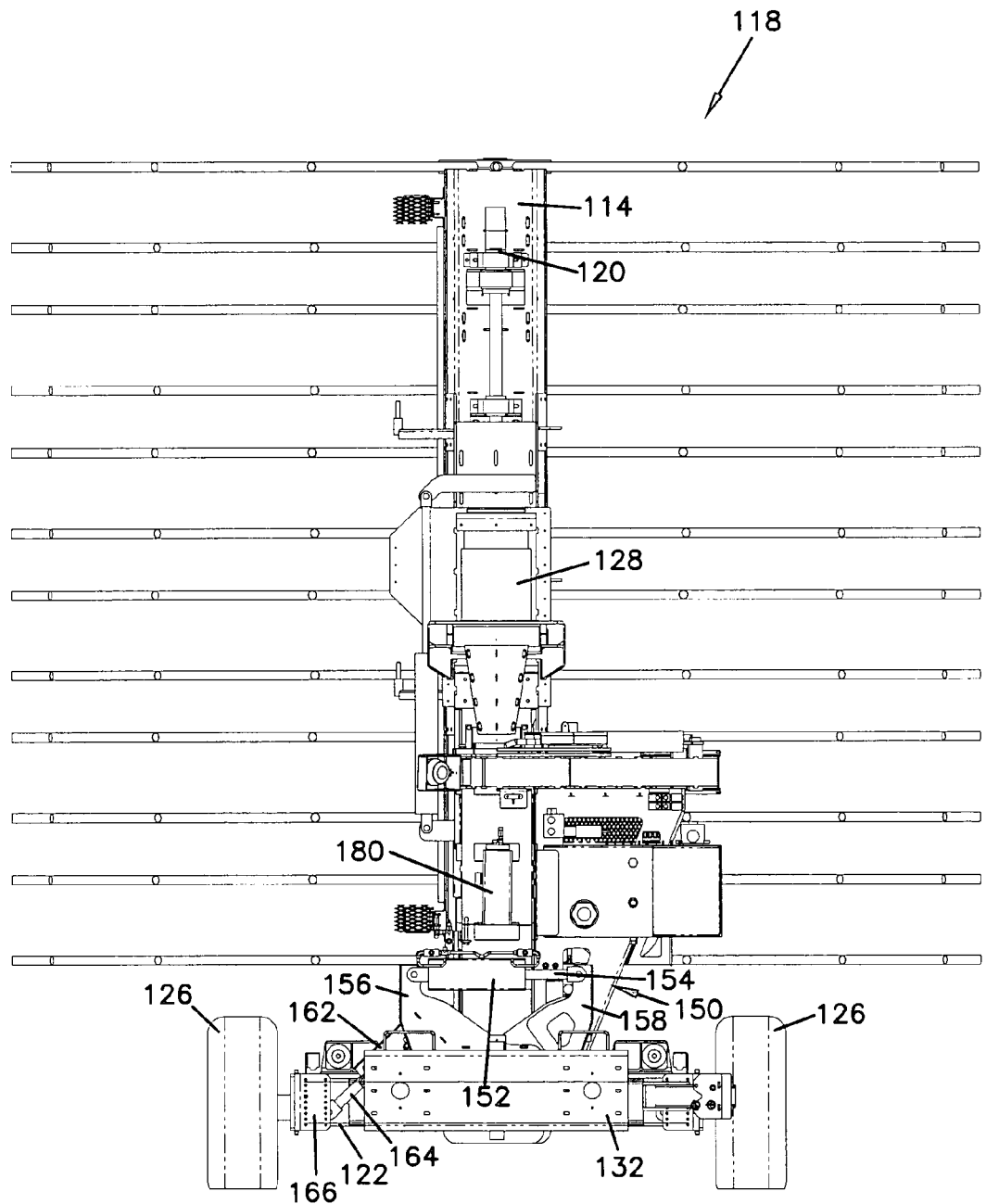
FIG. 5 is a front elevational view of the harvester and stabilizer at a level position.

As shown in FIGS. 5 and 6, under normal operating conditions, the telescoping assemblies 150 and 160 are not needed to correct for unwanted tilt of the mast 114. The cylinder and pistons 152 and 154, and 162 and 164 are at an intermediate position. The pendulum valve 180 is level and flow is not being increased to either the piston or cylinder end of the assemblies 150 and 160. The telescoping assemblies 150 and 160 are each held in position by the vented counterbalance valve 182 maintaining hydraulic pressure.

Figure 8:
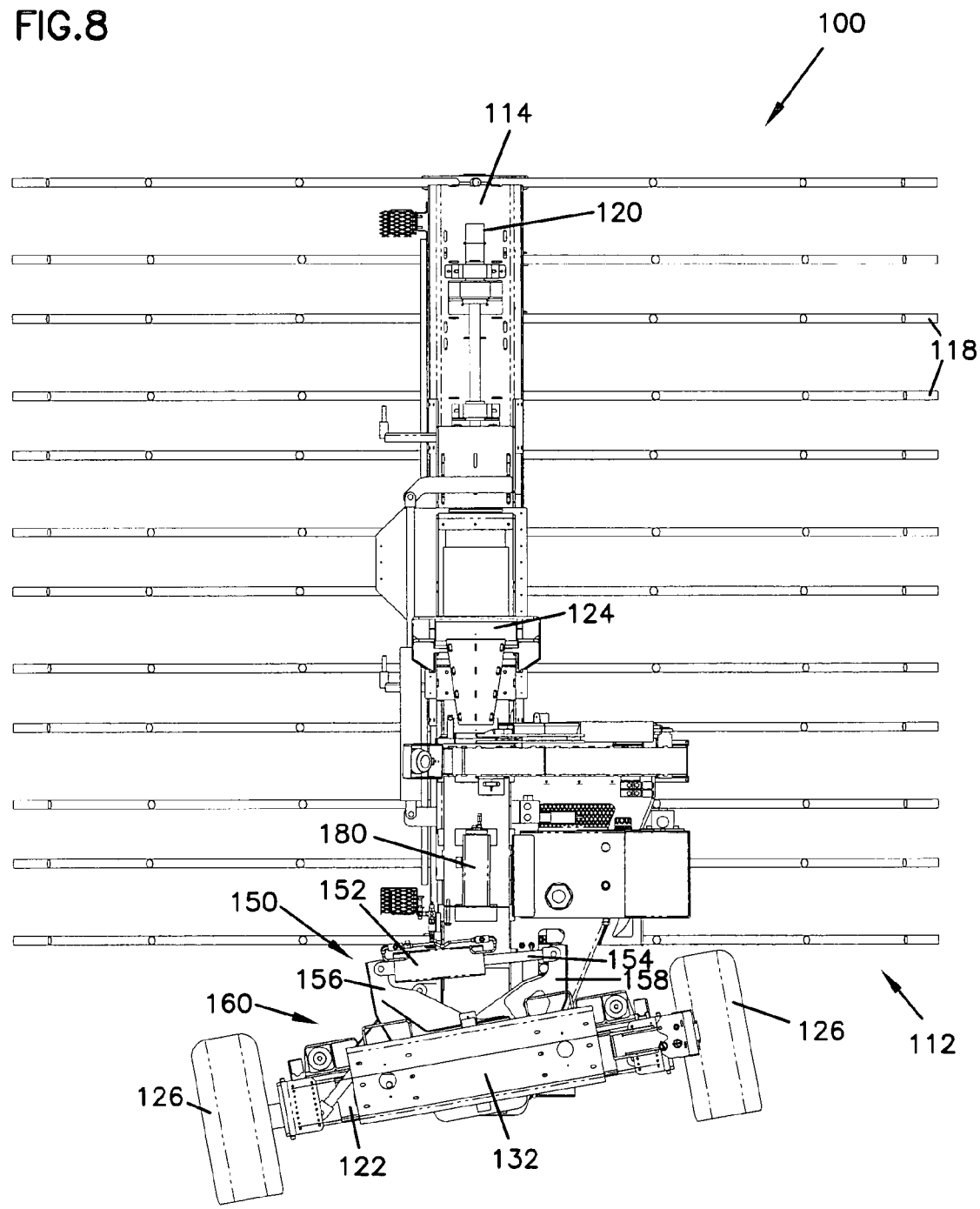
FIG. 8 is a front elevational view of the harvester and stabilizer shown in FIG. 7.
Figure 9:
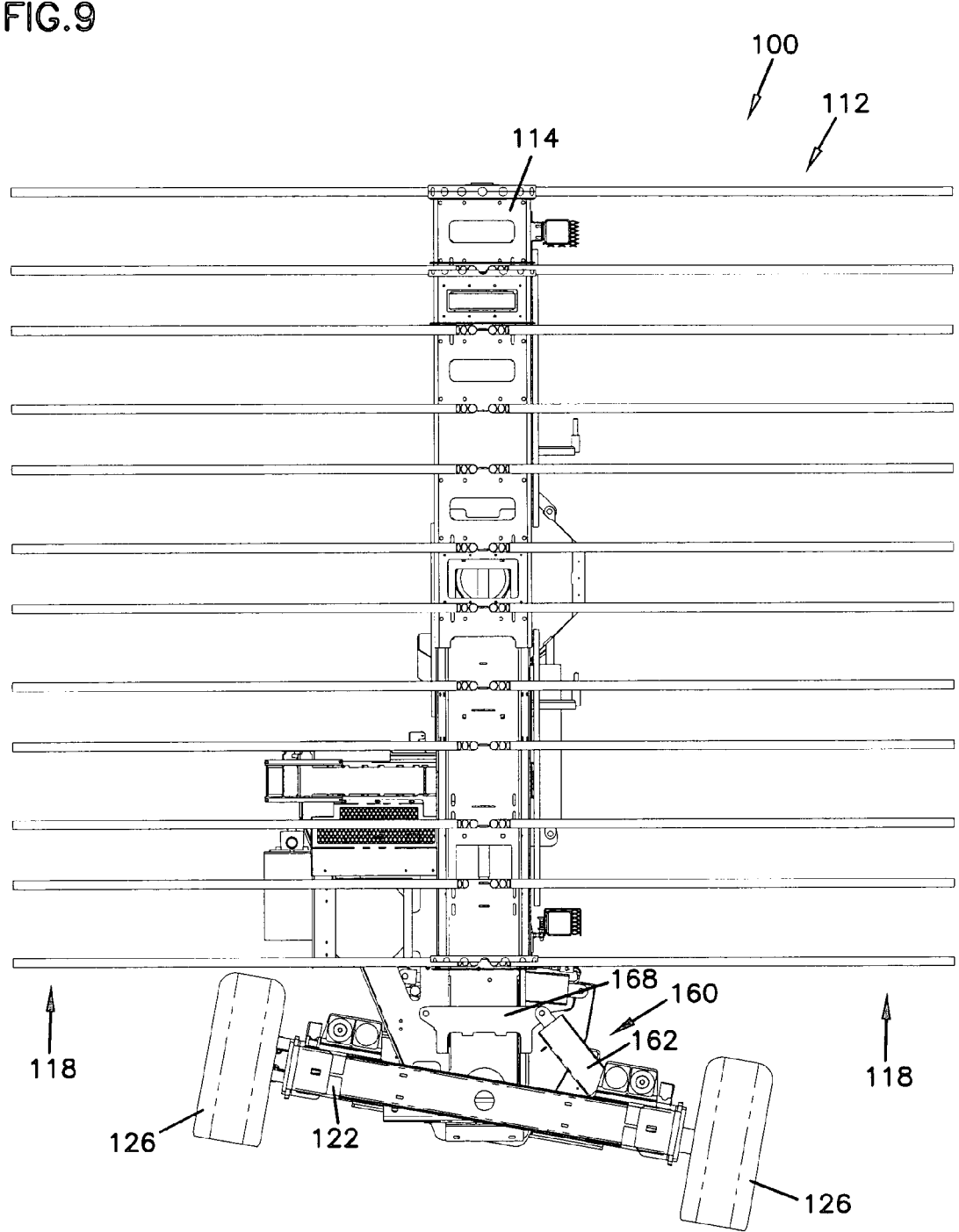
FIG. 9 is a rear elevational view of the harvester and stabilizer shown in FIG. 7.

Referring now to FIGS. 7–9, the harvester 100 is tilting to starboard and is requires correction. The cylinder and piston 152 and 154 are extended to correct the tilt by pivoting the frame 110 relative to the hitch 106. In a similar manner, the piston 164 is extended further from the cylinder 162 to push the axle 122 down relative to the frame 110. The combination of the movement of the assemblies 150 and 160 is to tilt the mast 114 to port, such as shown in FIG. 9, correcting for starboard tilt and maintaining the frame 110 in a level position and the mast 114 at a vertical position.

Figure 11:
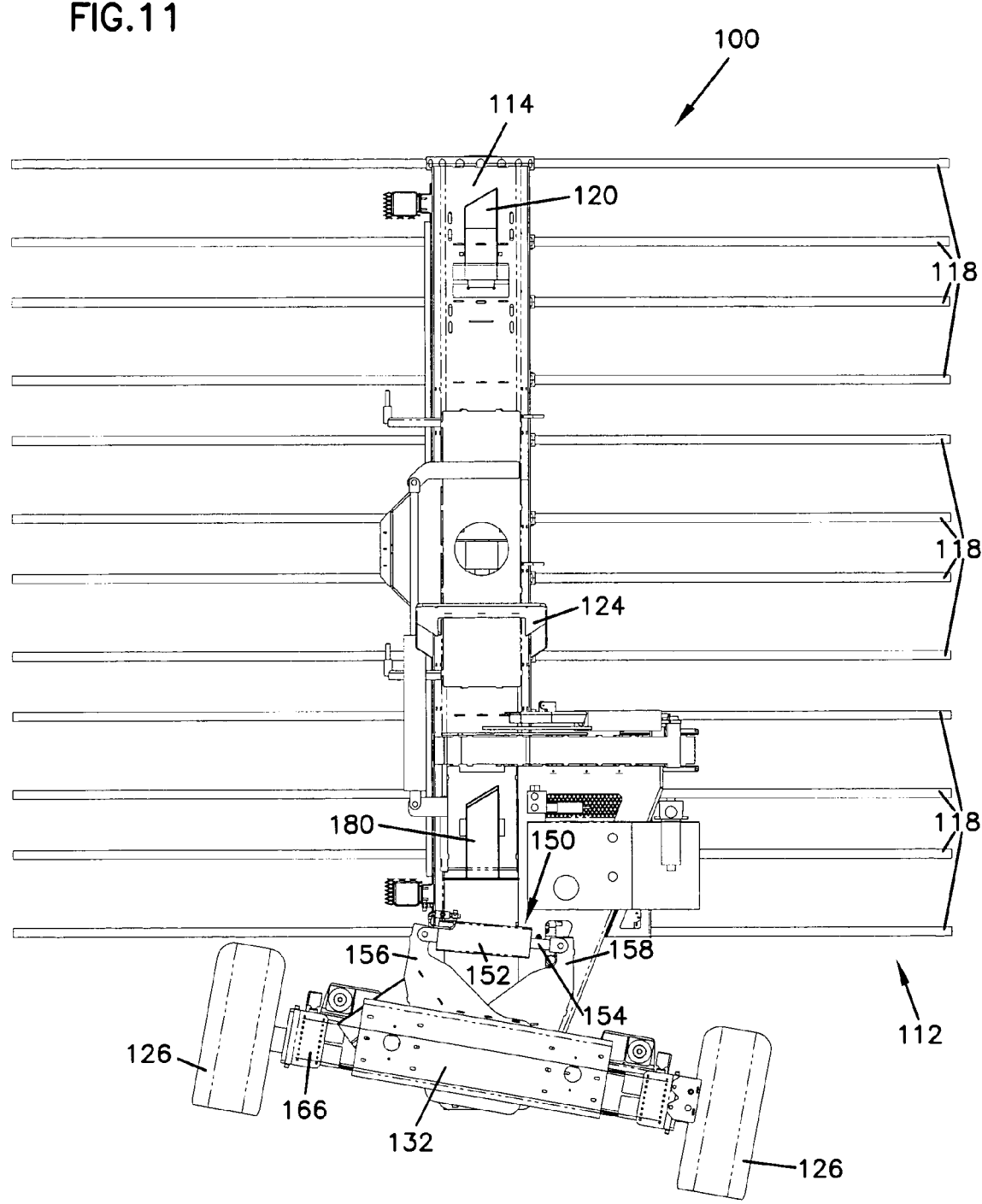
FIG. 11 is a front elevational view of the harvester and stabilizer shown in FIG. 10.
Figure 12:
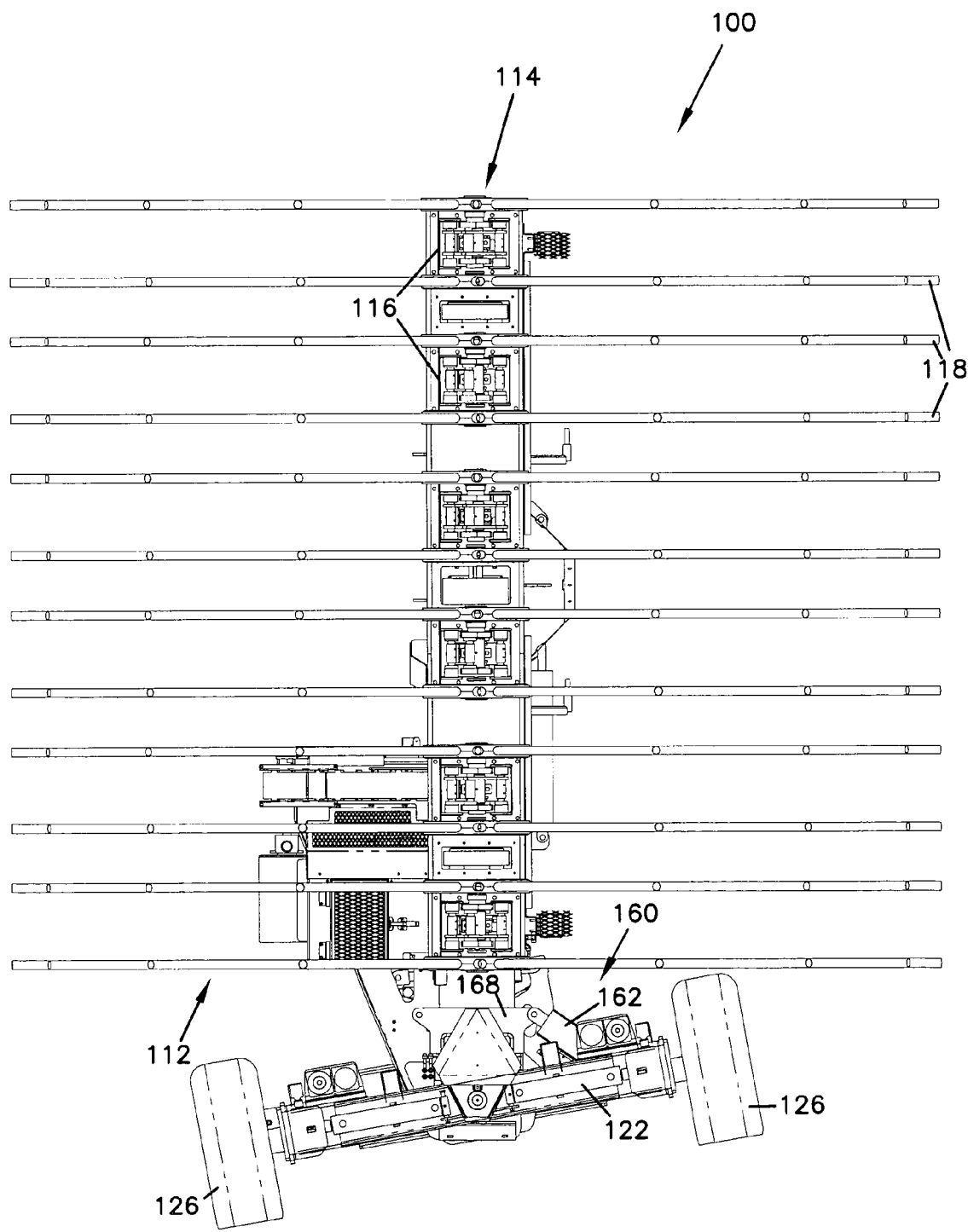
FIG. 12 is a rear elevational view of the harvester and stabilizer shown in FIG. 10.

Referring to FIGS. 10–12, when correction is needed to the opposite direction, the telescoping assemblies 150 and 160 are retracted. Retraction of the piston 154 and the cylinder 152 pulls the attachment members 156 and 158 closer together and therefore pivots the frame 110 relative to the hitch 106 in a clockwise direction when viewed in FIGS. 10 and 11 and therefore in a counterclockwise direction when viewed from the rear in FIG. 12. At the same time, the retraction of the cylinder 162 and piston 164 pulls the attachment members 166 and 168 closer together and pivots the frame 110 and the axle in a clockwise direction when view in FIGS. 10 and 11, and therefore in a counterclockwise direction when viewed from the rear, as in FIG. 12. This motion tends to push the mast 114 and the frame 110 to starboard as shown in FIG. 12, correcting for tilt to port. The combination of the positions of the telescope assemblies 150 and 160 provides stabilization and maintains the harvester 100 at a level position.

Figure 13:
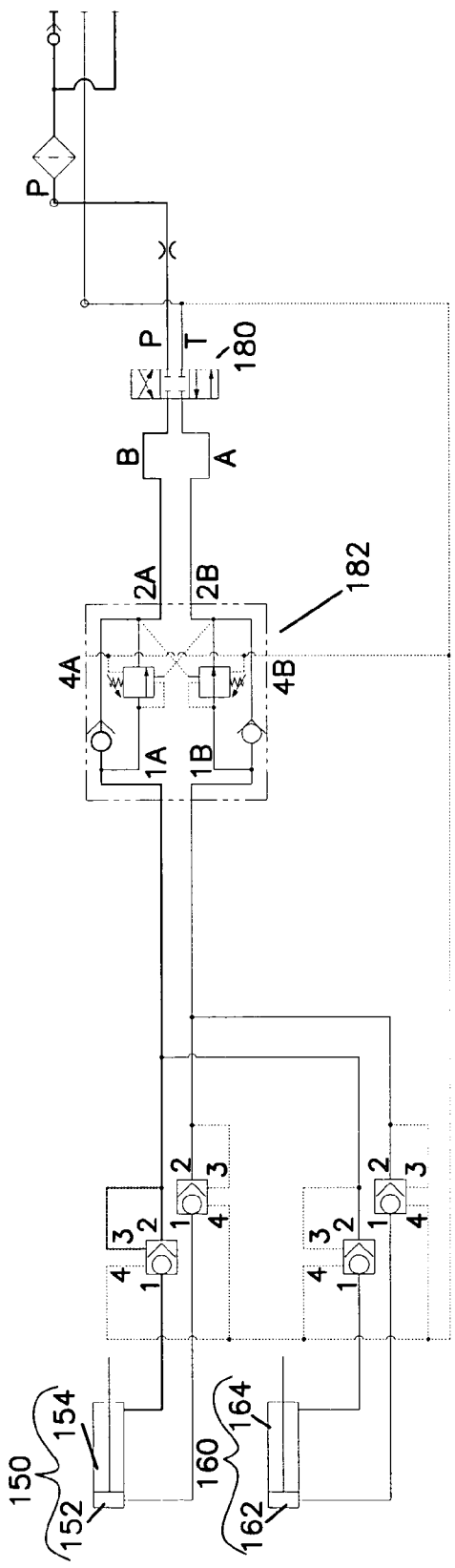
FIG. 13 is a diagrammatic view of a control valve system for the stabilizer system of the present invention wherein the harvester is level and no correction is being made.
Figure 14:
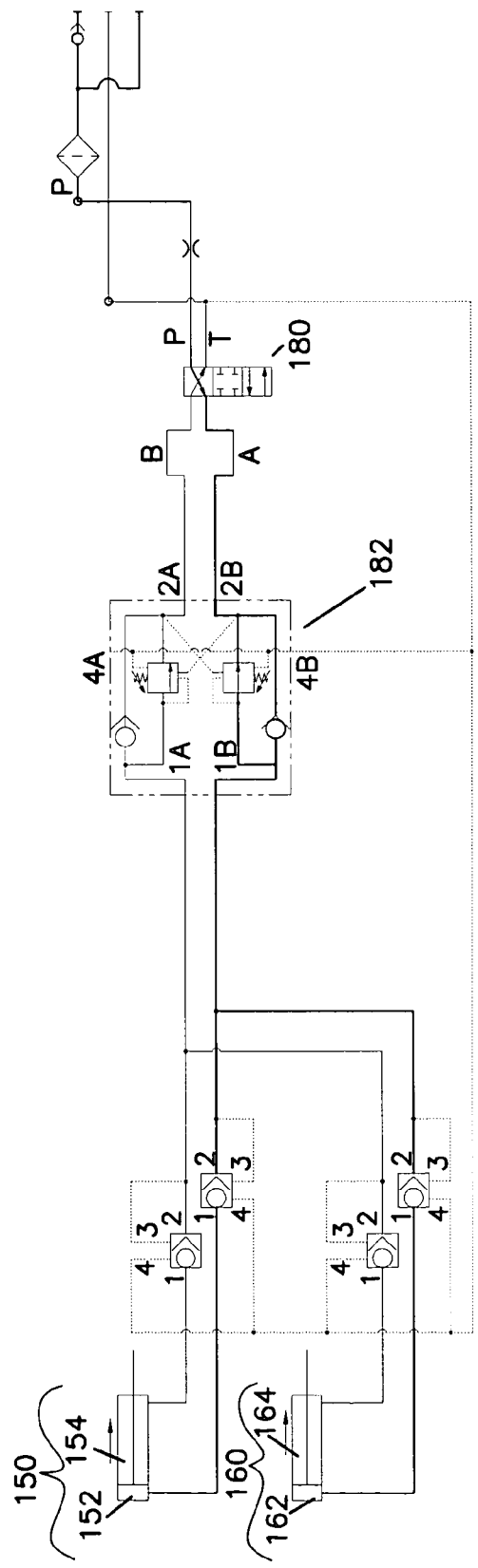
FIG. 14 is a diagrammatic view of the control valve system shown in FIG. 13 correcting tilting toward a first direction.
Figure 15:
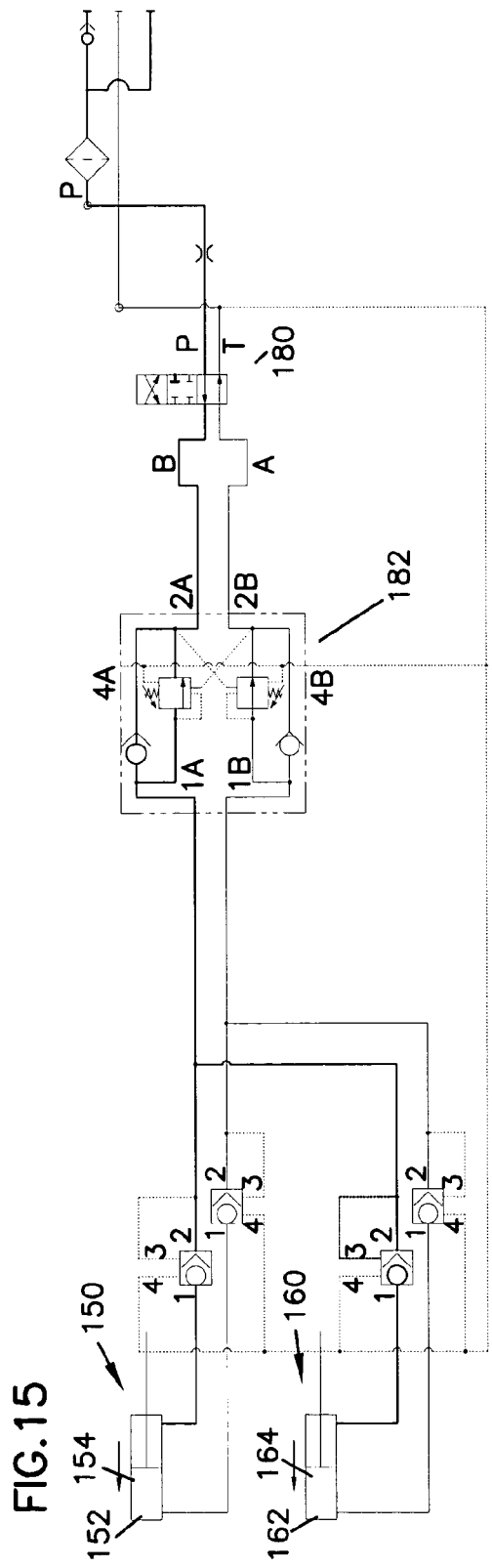
FIG. 15 shows a diagrammatic view of the control valve system shown in FIG. 13 correcting tilting toward a second direction.

Referring now to FIGS. 13–16, the control arrangement for the pendulum valve 180 and the entire valve arrangement is shown. When the harvester is level as shown in FIG. 13, there is no additional flow through the pendulum valve 180 to the cylinders 152 and 162 or pistons 154 and 164 and the counterbalance valve 182 locks the assemblies 150 and 160 in position. However, when the harvester 100 is tilted, such as to the starboard side and needs correction, the proportional valve 180 allows increased flow through to the cylinders 152 and 162 as shown in FIG. 14. The hydraulic pressure to the pistons 154 and 164 is decreased so that the pistons and cylinders extend to the position shown in FIGS. 7–9. This pushes the frame 110 and the mast 114 from a starboard tilting position toward port and ultimately maintaining a substantially vertical mast position, as shown in FIGS. 7–9.

When the pendulum valve 180 detects that the harvester 100 is tilting towards the port side, the flow to the piston end 154 and 164 of the telescoping assemblies 150 and 160 is proportionally increased and the pressure to the cylinders 152 and 162 is decreased. This retracts the pistons 154 and 164 into the cylinders 152 and 162 respectively. This pressure change has the effect of pushing the mast 114 and the frame 110 towards the starboard side and bringing the harvester 100 back to a level position, as shown in FIGS. 10–12.

Figure 16:
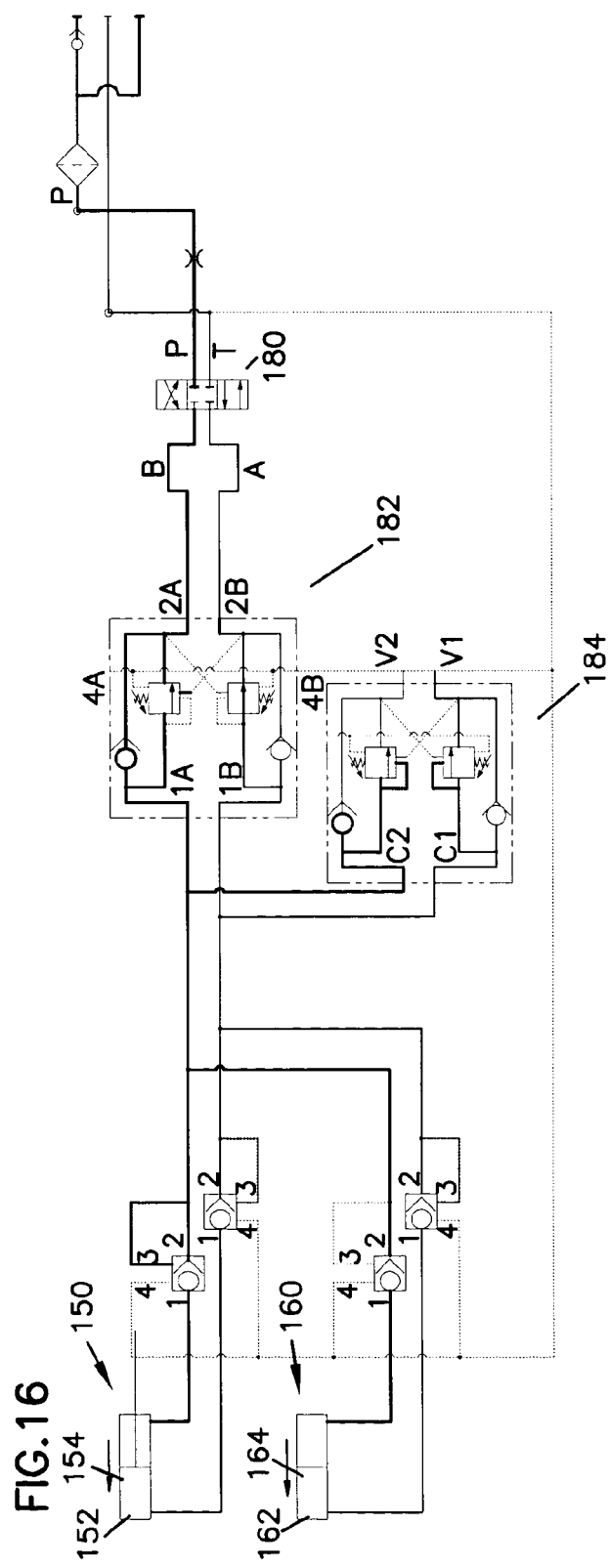
FIG. 16 shows a diagrammatic view of the control valve system shown in FIG. 13 correcting for striking an object.

In FIG. 16, the system is shown after abruptly encountering an obstacle and allowing for correction. The counterbalance valve 184 includes a dual vented counterbalance valve arrangement that provides pressure relief. The valve arrangement provides overload relief, such as when a port side rear wheel 126 encounters an obstacle and is abruptly pushed upward or when a port side rear wheel of the tractor 102 encounters an obstacle and is abruptly pushed upward. The starboard side tends to be pushed downward and therefore, the piston 164 is pushed to extend from the cylinder 162, but may not tilt the pendulum valve 180 to correct the tilt. Under such a condition, both the front and rear assemblies 150 and 160 are retracting. This provides a twist to the harvester 100 as the forward portion and the tractor 102 are substantially level. The mast 114, intermediate the assemblies 150 and 160, is therefore substantially maintained toward a vertical position. The valve 184 provides pressure relief for the surge in hydraulic pressure. In a similar manner, the relief valves 182 and 184 provide for overload relief when the starboard rear wheel 126 or starboard rear wheel of the tractor 102 strikes an object and a pressure surge occurs in the opposite direction.

It can be seen that the combination of the hitch 106 as well as the leveling assemblies 150 and 160 with the weight of the tractor 100 being utilized through the subframe 104, the present invention provides an effective system and for stabilizing and leveling the harvester 100. The present invention provides effective proportional responsiveness that is not possible with any prior systems.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A harvester system, comprising:
   a towing vehicle with a sub-frame;
   a towed harvester vehicle including a frame and a harvesting mast movably mounted on the frame;
   a sub-frame mounted to the towing vehicle and attached to the harvester vehicle;
   a coupling engaging the sub-frame and the harvester vehicle, the coupling including a gimbal and a rotary faceplate;
   a proportional flow valve;
   a first hydraulic cylinder assembly mounted to a vehicle axle; and
   a second hydraulic cylinder assembly mounted to the coupling;
   wherein the flow valve controls fluid flow to the first and second hydraulic cylinder assemblies, and wherein the proportional flow valve is actuated upon tilting from an untilted position, and wherein flow is increased to a cylinder end of the first hydraulic cylinder assembly and the second hydraulic cylinder assembly in proportion to a tilt angle when the vehicle is tilted to a first side, and wherein flow is increased to a piston end of the first hydraulic cylinder assembly and the second hydraulic cylinder assembly in proportion to a tilt angle when the vehicle is tilted to a second side.

2. A harvester system according to claim 1, wherein increasing flow to the cylinder ends of the first and second cylinders extends the cylinder assemblies, and wherein decreasing flow to the cylinder end of the first and second cylinders retracts the cylinder assemblies.

3. A harvester system according to claim 1, wherein extending the first hydraulic cylinder tips the vehicle toward the second side and retracting the first hydraulic cylinder tips the vehicle toward the first side.

4. A harvester system according to claim 3, wherein extending the second hydraulic cylinder tips the vehicle toward the second side and retracting the second hydraulic cylinder tips the vehicle toward the first side.

5. A harvester system according to claim 1, further comprising an overload relief assembly to vent fluid pressure due to the towing vehicle abruptly engaging uneven terrain before a change in towed harvester vehicle level position occurs from the proportional valve adjusting cylinder position.

6. A harvester system according to claim 1, further comprising an overload relief assembly to vent fluid pressure due to the towed harvester vehicle abruptly engaging uneven terrain before a change in towed harvester vehicle level position occurs from the proportional valve adjusting cylinder position.

7. A harvester system according to claim 1, wherein the sub-frame mounted to the towing vehicle is a rigid sub-frame.

8. A harvester system according to claim 1, wherein the flow valve comprises a pendulum valve.

9. A harvester system according to claim 1, wherein the towing vehicle is a tractor.

* * * * *

UNITED STATES PATENT AND TRADEMARK OFFICE
CERTIFICATE OF CORRECTION

| | |
|---|---|
| PATENT NO. | : 7,082,744 B2 |
| APPLICATION NO. | : 10/692307 |
| DATED | : August 1, 2006 |
| INVENTOR(S) | : Briesemeister et al. |

It is certified that error appears in the above-identified patent and that said Letters Patent is hereby corrected as shown below:

Front page, (75) Inventors: Insert omitted inventor --Allen E. Russell, Attica, NY (US)--after "Bergen, NY (US)"

Signed and Sealed this

Seventh Day of November, 2006

JON W. DUDAS
*Director of the United States Patent and Trademark Office*